(12) United States Patent
Davis

(10) Patent No.: US 7,057,501 B1
(45) Date of Patent: Jun. 6, 2006

(54) TAILGATE WARNING AND REPORTING SYSTEM

(76) Inventor: Darryl Davis, 845 Newton Ave., Baldwin, NY (US) 11510

( * ) Notice: Subject to any disclaimer, the term of this patent is extended or adjusted under 35 U.S.C. 154(b) by 127 days.

(21) Appl. No.: 10/830,526

(22) Filed: Apr. 23, 2004

(51) Int. Cl.
*B60Q 1/00* (2006.01)

(52) U.S. Cl. .............. 340/435; 340/436; 340/463; 340/468; 701/301

(58) Field of Classification Search .......... 340/435, 340/436, 438, 441, 463, 464, 472, 474, 468; 701/301
See application file for complete search history.

(56) References Cited

U.S. PATENT DOCUMENTS

| | | | | |
|---|---|---|---|---|
| 3,842,397 A | | 10/1974 | Sindle | 340/1 |
| 3,868,629 A | * | 2/1975 | Caine | 340/435 |
| 5,235,316 A | | 8/1993 | Qualizza | 340/436 |
| 5,627,510 A | | 5/1997 | Yuan | 340/435 |
| 5,828,319 A | | 10/1998 | Tonkin | 340/903 |
| 6,177,866 B1 | * | 1/2001 | O'Connell | 340/466 |
| 6,263,282 B1 | | 7/2001 | Vallancourt | 701/301 |
| 6,268,804 B1 | | 7/2001 | Janky | 340/903 |
| 6,502,020 B1 | * | 12/2002 | Lang | 701/29 |
| 6,590,495 B1 | | 7/2003 | Behbehani | 340/435 |
| 6,737,963 B1 | * | 5/2004 | Gutta et al. | 340/435 |
| 6,831,572 B1 | * | 12/2004 | Strumolo et al. | 340/903 |
| 6,950,013 B1 | * | 9/2005 | Scaman et al. | 340/436 |
| 2004/0183659 A1 | * | 9/2004 | Somuah | 340/435 |
| 2005/0134441 A1 | * | 6/2005 | Somuah | 340/435 |

* cited by examiner

*Primary Examiner*—Toan N. Pham
(74) *Attorney, Agent, or Firm*—Goldstein Law Offices PC.

(57) ABSTRACT

A tailgate warning system, for use in a target vehicle, for determining unsafe following and followed distances, having a front rangefinder, a rear rangefinder, a vehicle speed sensor, incident memory, hazard lights, and a control unit. When an unsafe following distance is determined by the control unit using the front rangefinder and speed sensor, a dashboard audible visual alert is activated. When an unsafe followed distance is determined by the control unit using the rear rangefinder and speed sensor, the dashboard audible visual alert and the hazard lights are activated. Incidents of tailgating are recorded in the incident memory.

2 Claims, 2 Drawing Sheets

TAILGATE WARNING AND REPORTING SYSTEM

BACKGROUND OF THE INVENTION

The invention relates to a tailgate warning system. More particularly, the invention relates to a system for warning the driver of a vehicle with the system installed that another vehicle is driving dangerously close behind the vehicle, or that the vehicle is tailgating another vehicle located immediately in front of the vehicle. The system can report the tailgating incident to a centralized computer system for risk assessment purposes.

As highway speeds increase, the potential for disaster also increases. At a given speed, the closer the vehicles get together the less time there is to avoid an accident. Also, as the speed increases, the available reaction time decreases.

Skilled drivers know that safety requires that they maintain a safe following distance of at least two or three seconds between their vehicle and a vehicle they are following. Despite the well known dangers, tailgating is a prevalent problem. In particular, many people are habitual tailgaters. They often leave one second or less between them and vehicles immediately in front. This practice is an invitation for disaster.

Insurance companies employ a variety of factors to assess the relative risk of their insured drivers and determine appropriate insurance premiums for them. In this regard, it is undeniable that people who do not tailgate are considerably less likely to be involved in automobile collisions than people who habitually tailgate. Unfortunately, it is virtually impossible for insurance companies to distinguish those drivers who engage in unsafe tailgating from those drivers who consistently maintain a safe driving distance.

Various systems have been proposed that monitor the separation of vehicles or warn a driver about a tailgating condition. For example, U.S. Pat. No. 3,842,397 to Sindle discloses an ultrasonic distance detection system for vehicles. U.S. Pat. No. 6,177,866 to O'Connell discloses a tailgate warning system. U.S. Pat. No. 6,263,282 to Vallancourt discloses a system and method for warning of dangerous driving conditions. U.S. Pat. No. 5,828,319 to Tonkin et al. discloses a motor vehicle display system and ranging device. U.S. Pat. No. 6,590,495 to Behbehani discloses an automobile distance warning and alarm system. U.S. Pat. No. 5,627,510 to Yuan discloses a vehicular safety distance alarm system. U.S. Pat. No. 6,268,804 to Janky et al. discloses a dynamic monitoring of vehicle separation. U.S. Pat. No. 5,235,316 to Qualizza discloses a vehicle collision avoidance system.

While these units may be suitable for the particular purpose employed, or for general use, they would not be as suitable for the purposes of the present invention as disclosed hereafter.

SUMMARY OF THE INVENTION

It is an object of the invention to produce a tailgating warning system that detects when a following vehicle is at an unsafe distance and signals a warning in response thereto. Accordingly the warning system has a rear rangefinder that determines when the following vehicle has surpassed a threshold distance and provides an audible and visual alert on the vehicle dashboard.

It is another object of the invention to provide a tailgating warning system that signals the following vehicle that they are tailgating. Accordingly, when a tailgating condition is detected, the vehicle "hazard" or "four way flashers" are activated.

It is yet another object of the invention to provide a tailgating warning system that warns a driver that their own vehicle is tailgating another vehicle. Accordingly, a front rangefinder is provided in the vehicle.

It is a further object of the invention to provide a tailgating warning system that records and reports tailgating incidents. Accordingly, the tailgate warning system has an incident memory that records incidents in which the vehicle was determined to be tailgating another vehicle. Further, a data transmitter may be used to transmit the incident records to a centralized computer system for risk assessment purposes.

The invention is a tailgate warning system, for use in a target vehicle, for determining unsafe following and followed distances, having a front rangefinder, a rear rangefinder, a vehicle speed sensor, incident memory, hazard lights, and a control unit. When an unsafe following distance is determined by the control unit using the front rangefinder and speed sensor, a dashboard audible visual alert is activated. When an unsafe followed distance is determined by the control unit using the rear rangefinder and speed sensor, the dashboard audible visual alert and the hazard lights are activated. Incidents of tailgating are recorded in the incident memory.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
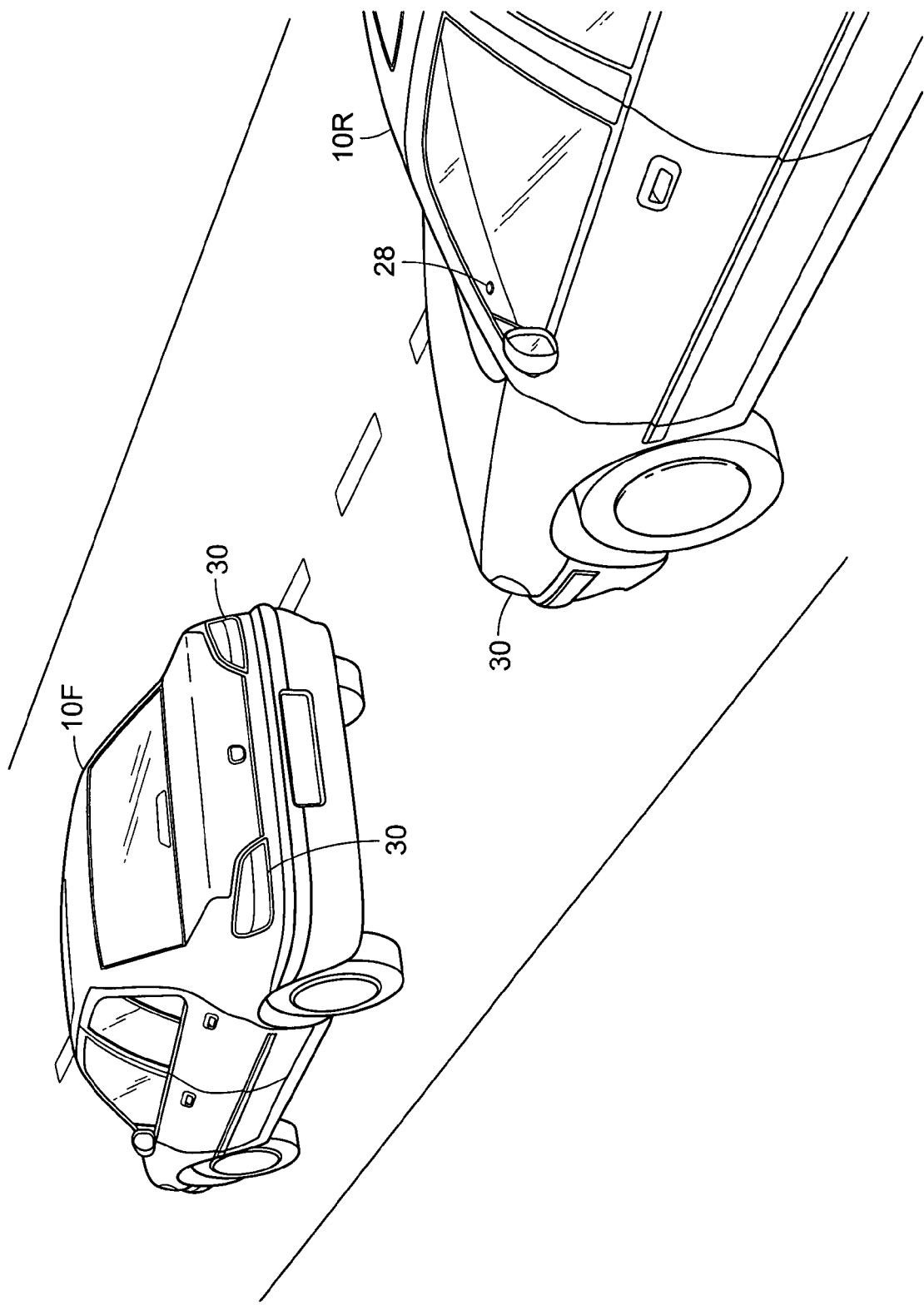
FIG. 1 is a diagrammatic perspective view, illustrating a pair of vehicles employing the present invention.

FIG. 1 illustrates a front vehicle 10F and a rear vehicle 10R. In the present illustration, both vehicles are equipped with a tailgate warning system according to the present invention. When referring to the operational features, modes, and responses of the tailgate warning system, the reacting vehicle is referred to as the "target vehicle", whereas the vehicle in front or behind the target vehicle is referred to as an "other vehicle", a "followed vehicle", or a "following vehicle".

Figure 2:
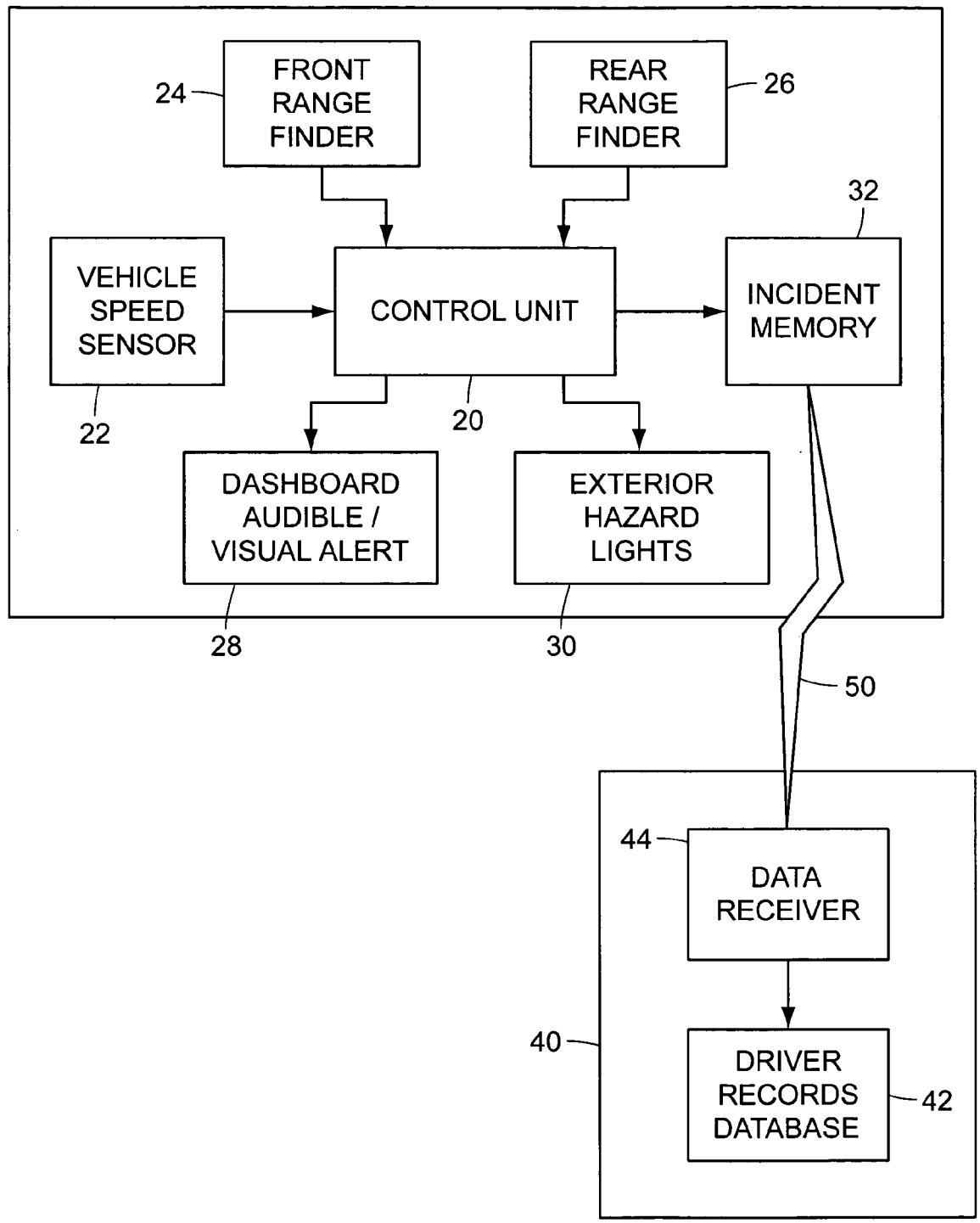
FIG. 2 is a block diagram, illustrating the functional interconnection of various components of the present invention.

Referring now to FIG. 2, the tailgate warning system is installed within the target vehicle, and includes a control unit 20 that monitors and controls the overall functionality of the system. The control unit 20 may be a microprocessor, microcontroller, or a custom device configured to manage the various input and output constraints required by the functionality described hereinbelow.

The tailgate warning system has a vehicle speed sensor 22 determines the speed of the target vehicle and communicates the same to the control unit 20. The tailgate warning system also has a front rangefinder 24 capable of determining the distance between the target vehicle and a followed vehicle. For illustration, referring momentarily to FIG. 1, if the rear vehicle 10R is the target vehicle, then the front vehicle 10F is the followed vehicle.

The tailgate warning system also has a rear rangefinder 26 capable of determining the distance between the target vehicle and a following vehicle. For illustration, referring momentarily to FIG. 1, if the front vehicle 10F is the target vehicle, then the rear vehicle 10R is the following vehicle.

Both the front and rear rangefinders, 24 and 26, may employ ultrasonic rangefinding technology. Any other technology that can accurately determine the distance of the followed and following vehicles, however, may be employed for the purposes of the present invention.

The tailgate warning system determines when an unsafe following distance exists in front of or behind the target vehicle. The distance of the unsafe following distance, however, is speed dependent. Accordingly, when the front and rear rangefinders 24 and 26 determine a following or followed distance, the target vehicle speed must also be ascertained before deciding if a safe following distance has been breached. Thus, using data from the vehicle speed sensor 22 and the front and rear rangefinders 24 and 26, the control unit 20 of the tailgate warning system will detect the presence of a front unsafe following distance and a rear unsafe following distance.

The tailgate warning system has a dashboard audible and visual alert 28 that signals tailgating conditions to the driver of the target vehicle. In particular, if the control unit 20 detects a front unsafe following distance, the driver will be alerted via the dashboard audible and visual alert 28. If the control unit 20 detects a rear unsafe following distance, the driver will also be alerted via the dashboard audible and visual alert 28, but with a distinctive warning. Such distinctive warning can employ different colored lights or different alert tones than would be generated in response to a front unsafe following distance. Further, exterior hazard lights 30 are activated in response to the detection of a rear unsafe following distance. The exterior hazard lights 30 are located at front and rear corners of the target vehicle, and flash when activated. The flashing exterior hazard lights 30 are intended to alert a following vehicle that it is traveling behind the target vehicle at an unsafe distance.

Further in accordance with the goals of the present invention, an incident memory 32 is provided in direct communication with the control unit 20 for recording tailgating incidents. In particular, the incident memory 32 records and time stamps incidents where the target vehicle was following another vehicle too closely. The incident memory 32 may also be used, however, to record incidents where the target vehicle was followed too closely.

In order to allow an other entity to assess the relative risk of the target vehicle for insurance purposes or the like, the incidents may be instantly or periodically communicated to a centralized computer system 40 that contains a driver records database 42. To facilitate such communication, the centralized computer system 40 has a data receiver 44, and the tailgate warning system has a data transmitter 34. The data transmitter 46 communicates the tailgating incidents to the data receiver 44 through a communication medium 50. The communication medium 50 may be any suitable wired or wireless data communication scheme. Following such communication, the incidents are recorded in the driver records database, and may be used for statistically assessing the risk of the target vehicle (and its driver) using conventional actuarial techniques.

In conclusion, herein is presented a tailgate warning system, for detecting, informing, and recording incidents where vehicles follow or are followed at unsafe distances. The invention is illustrated by example in the drawing figures, and throughout the written description. It should be understood that numerous variations are possible, while adhering to the inventive concept. Such variations are contemplated as being a part of the present invention.

What is claimed is:

1. A tailgate warning system, installed within a target vehicle, having front and rear exterior corners, comprising:
    a front rangefinder, for determining a following distance between the target vehicle and a vehicle traveling in front of the target vehicle;
    a rear rangefinder, for determining a followed distance between the target vehicle and a vehicle traveling behind the target vehicle;
    a target vehicle speed sensor, for determining the speed of the target vehicle;
    an audible and visual dashboard alert, for producing an audible and visual warning;
    exterior hazard lights located at the front and rear exterior corners of the target vehicle;
    a control unit, for determining if an unsafe following distance has been breached from the determined following distance and the determined target vehicle speed and activating the audible and visual dashboard alert in response thereto, and for determining if an unsafe followed distance has been breached from the determined followed distance and the target vehicle speed and activating the audible and visual dashboard alert and the exterior hazard lights in response thereto;
    an incident memory, for recording incidents of unsafe following distance determinations by the control unit; and wherein the system is used in conjunction with a centralized computer system having a driver records database and a data receiver in communication with the driver records database; and
    a data transmitter for transmitting the recorded incidents in the incident memory to the driver records database through the data receiver.

2. A tailgate warning method, for use by a target vehicle having a front rangefinder, a rear rangefinder, a vehicle speed sensor, a dashboard audible visual alert, and front and rear exterior hazard lights, comprising the steps of:
    determining the target vehicle speed by the speed sensor;
    determining whether a safe following distance has been breached by determining a front following distance using the front rangefinder and considering the target vehicle speed;
    determining whether a safe followed distance has been breached by determining a rear followed distance using the rear rangefinder and considering the target vehicle speed;
    activating the dashboard audible and visual alert in response to the determination of an unsafe following distance;
    activating the dashboard audible and visual alert and flashing the exterior hazard lights in response to the determination of an unsafe followed distance wherein the target vehicle has an incident memory, and wherein the step of activating the dashboard audible and visual alert in response to the determination of an unsafe following distance further comprises recording a tailgating incident in the incident memory; and
    using a centralized computer system having a driver records database; and communicating tailgating incidents recorded in the incident memory to the driver records database.

* * * * *